United States Patent
Zhu et al.

(10) Patent No.: US 10,812,980 B2
(45) Date of Patent: Oct. 20, 2020

(54) COMMUNICATION METHOD, SECURITY NODE NETWORK ELEMENT, AND TERMINAL

(71) Applicant: Huawei Technologies Co., Ltd., Shenzhen (CN)

(72) Inventors: Hualin Zhu, Shanghai (CN); Huan Li, Shanghai (CN); Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/380,746

(22) Filed: Apr. 10, 2019

(65) Prior Publication Data

US 2019/0239081 A1 Aug. 1, 2019

Related U.S. Application Data

(63) Continuation of application No. PCT/CN2016/101716, filed on Oct. 10, 2016.

(51) Int. Cl.
*H04W 12/08* (2009.01)
*H04L 29/06* (2006.01)
(Continued)

(52) U.S. Cl.
CPC ......... *H04W 12/0808* (2019.01); *H04L 29/06* (2013.01); *H04L 63/029* (2013.01);
(Continued)

(58) Field of Classification Search
None
See application file for complete search history.

(56) References Cited

U.S. PATENT DOCUMENTS

| 7,779,461 B1 | 8/2010 | Liu et al. |
| 9,215,588 B2 | 12/2015 | Andreasen |

(Continued)

FOREIGN PATENT DOCUMENTS

| CN | 101132324 A | 2/2008 |
| CN | 101409879 A | 4/2009 |

(Continued)

OTHER PUBLICATIONS

Machine Translation and Abstract of Chinese Publication No. CN103581138, Feb. 12, 2014, 18 pages.

(Continued)

*Primary Examiner* — Joseph P Hirl
*Assistant Examiner* — Hassan Saadoun
(74) *Attorney, Agent, or Firm* — Conley Rose, P.C.

(57) ABSTRACT

Described herein are a communication method, a security node network element, and a terminal. The method includes receiving, by a security node network element, a first data packet carrying first user plane data or first control signaling from a terminal, the first data packet is transmitted via a first security connection or a second security connection, the first security connection is used to transmit the first data packet carrying the first user plane data, and the second security connection is used to transmit the first data packet carrying the first control signaling; and sending the first control signaling to a control plane (CP) function entity if the first data packet is transmitted via the second security connection.

20 Claims, 5 Drawing Sheets

(51) Int. Cl.
*H04W 76/12* (2018.01)
*H04W 88/14* (2009.01)

(52) U.S. Cl.
CPC .............. *H04L 63/18* (2013.01); *H04L 63/20* (2013.01); *H04L 63/0428* (2013.01); *H04L 63/164* (2013.01); *H04L 69/16* (2013.01); *H04W 76/12* (2018.02); *H04W 88/14* (2013.01)

(56) References Cited

U.S. PATENT DOCUMENTS

| | | |
|---|---|---|
| 2005/0198691 A1 | 9/2005 | Xiang et al. |
| 2006/0126644 A1 | 6/2006 | Akahane et al. |
| 2011/0138458 A1 | 6/2011 | Kumar et al. |
| 2013/0254531 A1* | 9/2013 | Liang .................. H04L 63/164 713/151 |
| 2014/0029513 A1 | 1/2014 | Takahashi et al. |
| 2014/0079070 A1 | 3/2014 | Sonoda et al. |
| 2015/0305041 A1 | 10/2015 | Kim |
| 2016/0094351 A1 | 3/2016 | Rune et al. |
| 2017/0013453 A1* | 1/2017 | Lee .................. H04W 12/04031 |
| 2017/0149743 A1 | 5/2017 | Fukuda |

FOREIGN PATENT DOCUMENTS

| | | |
|---|---|---|
| CN | 101686578 A | 3/2010 |
| CN | 102006294 A | 4/2011 |
| CN | 102469087 A | 5/2012 |
| CN | 103581138 A | 2/2014 |
| CN | 105247946 A | 1/2016 |
| EP | 2416530 A1 | 2/2012 |
| EP | 2632103 A1 | 8/2013 |
| JP | 2001345864 A | 12/2001 |
| JP | 2006246066 A | 9/2006 |
| JP | 2013131793 A | 7/2013 |
| JP | 2017098666 A | 6/2017 |
| KR | 20150119798 A | 10/2015 |
| RU | 2586587 C2 | 6/2016 |
| WO | 2014191053 A1 | 12/2014 |

OTHER PUBLICATIONS

Qualcomm Incorporated, "Update of Solution 8.6 for key issue 8," SA WG2 Meeting #116, S2-164639, Aug. 29-Sep. 2, 2016, 9 pages.
Foreign Communication From a Counterpart Application, PCT Application No. PCT/CN2016/101716, English Translation of International Search Report dated Jun. 9, 2017, 2 pages.
Foreign Communication From a Counterpart Application, PCT Application No. PCT/CN2016/101716, English Translation of Written Opinion dated Jun. 9, 2017, 5 pages.
Foreign Communication From a Counterpart Application, European Application No. 16918809.1, Extended European Search Report dated Aug. 1, 2019, 7 pages.
Machine Translation and Abstract of Chinese Publication No. CN101132324, Feb. 27, 2008, 14 pages.
Machine Translation and Abstract of Chinese Publication No. CN101409879, Apr. 15, 2009, 16 pages.
Machine Translation and Abstract of Chinese Publication No. CN102469087, May 23, 2012, 35 pages.
Foreign Communication From a Counterpart Application, Chinese Application No. 201680089520.1, Chinese Office Action dated Feb. 28, 2020, 6 pages.
Foreign Communication From a Counterpart Application, Chinese Application No. 201680089520.1, Chinese Search Report dated Feb. 19, 2020, 3 pages.
Ming, Z., et al, "Future Mobile Communication Oriented Hyper Cellular Access Network Architecture," ZTE Technology Journal, Apr. 10, 2014, 6 pages.

* cited by examiner

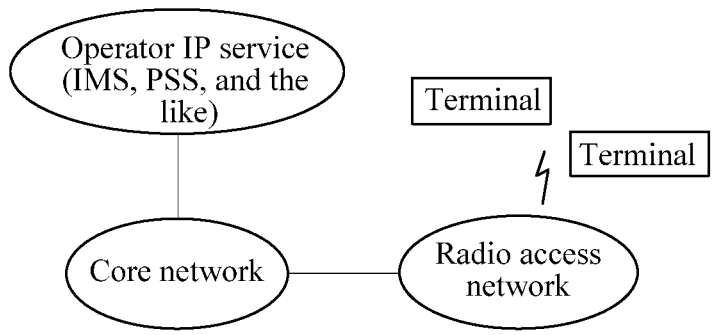
FIG. 1A
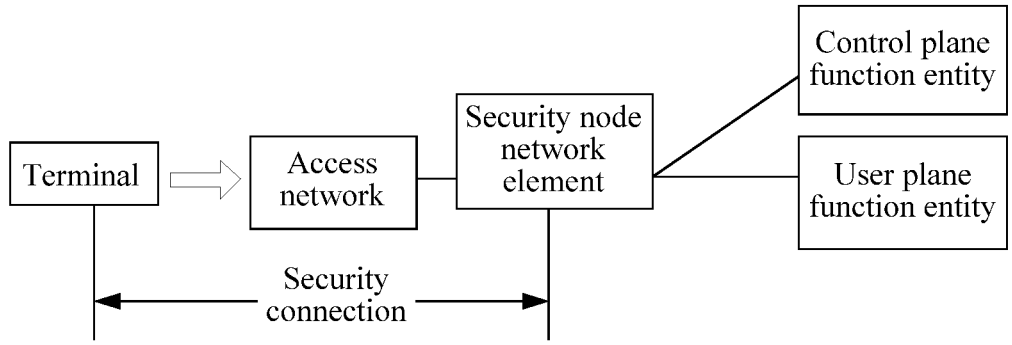
FIG. 1B
| IP header | Authentication header or encapsulation security payload | Source IP | TCP | User plane data or control signaling |
FIG. 2

| IP header | Authentication header (second SPI) | Source IP | TCP | First control signaling |

| IP header | Authentication header (first SPI) | Source IP | TCP | First user plane data |

COMMUNICATION METHOD, SECURITY NODE NETWORK ELEMENT, AND TERMINAL

CROSS-REFERENCE TO RELATED APPLICATIONS

This application is a continuation of International Patent Application No. PCT/CN2016/101716, filed on Oct. 10, 2016, the disclosure of which is hereby incorporated by reference in its entirety.

TECHNICAL FIELD

Embodiments of the present disclosure relate to the communications field, and in particular, to a communication method, a security node network element, and a terminal.

BACKGROUND

In a communications network, when receiving an uplink data packet sent by a terminal, a security node network element needs to identify whether the uplink data packet carries control signaling. If the uplink data packet carries control signaling, the security node network element sends the control signaling to a control plane (CP) function entity; or if the uplink data packet carries no control signaling, the security node network element sends user plane data in the uplink data packet to a user plane (UP) function entity.

In an existing solution, a data packet carrying control signaling may be identified in a manner of setting a destination Internet Protocol (IP) address of the data packet to a specific destination IP address. However, this manner has a security problem. For example, in practice, a destination IP address of a data packet carrying no control signaling may be set by a malicious application in a terminal to the specific destination IP address. Consequently, considered as control signaling, user plane data carried in the data packet is sent to a CP function entity, causing an error.

SUMMARY

According to a first aspect, a communication method is provided. The method includes: receiving, by a security node network element, a first data packet from a terminal, where the first data packet carries first user plane data or first control signaling, the first data packet is transmitted via a first security connection or a second security connection, the first security connection is used to transmit the first data packet carrying the first user plane data, and the second security connection is used to transmit the first data packet carrying the first control signaling; and sending, by the security node network element, the first control signaling to a CP function entity if the first data packet is transmitted via the second security connection; or sending, by the security node network element, the first user plane data to a UP function entity if the first data packet is transmitted via the first security connection.

A data packet carrying control signaling and a data packet carrying user plane data that are between the security node network element and the terminal are respectively transmitted via different security connections. In this way, the security node identifies whether the data packet carries a control signaling or a user plane data without a need of using a destination IP address that is in the data packet and that a malicious application may modify, but identifies, by using a security connection identifier of a non-application layer, a network layer, or a transport layer, the data packets sent via the different security connections, and identifies, by determining the data packets sent via the different security connections, whether the data packet carries the control signaling or the user plane data. Therefore, modification by the malicious application can be avoided, and transmission security of the user plane data or the control signaling is improved.

It should be understood that "first" and "second" in the first security connection and the second security connection are merely intended to distinguish between different objects. In some embodiments, the first data packet carrying the first user plane data may be transmitted by using the second security connection, and/or the first data packet carrying the first control signaling may be transmitted by using the first security connection. This is not limited in the present disclosure.

With reference to the first aspect, in some implementations of the first aspect, the method further includes: sending, by the security node network element, a second data packet to the terminal via the second security connection, where the second data packet carries second control signaling; or sending, by the security node network element, a second data packet to the terminal via the first security connection, where the second data packet carries second user plane data.

The security node network element sends a downlink data packet to the terminal. The security node network element may send, via different security connections, downlink data packets carrying different contents. A downlink data packet carrying control signaling and a downlink data packet carrying user plane data are respectively transmitted via the different security connections. Therefore, after receiving the downlink data packet sent by the security node network element, the terminal may identify the content in the downlink data packet by determining whether a security connection for transmitting the downlink data packet is the first security connection or the second security connection. Therefore, modification by a malicious application in the terminal can be avoided, and the security of downlink transmission is improved.

With reference to the first aspect, in some implementations of the first aspect, the method further includes: receiving, by the security node network element, the second control signaling from the CP function entity; or receiving, by the security node network element, the second user plane data from the UP function entity.

It should be understood that "first" and "second" in the first security connection and the second security connection are intended to only distinguish different objects. In some embodiments, the second data packet carrying the first user plane data may be transmitted via the second security connection, and/or the second data packet carrying the first control signaling may be transmitted via the first security connection. This is not limited in the present disclosure.

With reference to the first aspect, in some implementations of the first aspect, when the second data packet carries the second control signaling, the second data packet further carries an identifier of the second security connection; or when the second data packet carries the second user plane data, the second data packet further carries an identifier of the first security connection.

With reference to the first aspect, in some implementations of the first aspect, after the receiving, by a security node network element, a first data packet from a terminal, the method further includes: determining, by the security node network element, that the first data packet is transmitted via the second security connection or the first security connection.

With reference to the first aspect, in some implementations of the first aspect, the first data packet further carries the identifier of the second security connection or the identifier of the first security connection, and the determining, by the security node network element, that the first data packet is transmitted via the second security connection or the first security connection includes: when the first data packet further carries the identifier of the second security connection, determining, by the security node network element, that the first data packet is transmitted via the second security connection; or when the first data packet further carries the identifier of the first security connection, determining, by the security node network element, that the first data packet is transmitted via the first security connection.

With reference to the first aspect, in some implementations of the first aspect, the first security connection may be a first IP Security (IPsec) tunnel, and the second security connection may be a second IPsec tunnel.

With reference to the first aspect, in some implementations of the first aspect, the identifier of the second security connection may be a second security parameter index (SPI) value, and the identifier of the first security connection may be a first SPI value.

According to a second aspect, a communication method is provided. The method includes: generating, by a terminal, a first data packet, where the first data packet carries first user plane data or first control signaling; and sending, by the terminal, the first data packet to the security node network element, where the first data packet is transmitted via a first security connection or a second security connection, the first security connection is used to transmit the first data packet carrying the first user plane data, and the second security connection is used to transmit the first data packet carrying the first control signaling.

In the second aspect, for some implementations corresponding to the first aspect, refer to the descriptions of the first aspect. Details are not described herein.

According to a third aspect, another communication method is provided. The method includes: receiving, by a security node network element, second control signaling from a CP function entity, or receiving, by a security node network element, second user plane data from a UP function entity; sending, by the security node network element, a second data packet to a terminal, where the second data packet carries the second control signaling or the second user plane data, and when the second data packet carries the second control signaling, the second data packet is transmitted via a second security connection, or when the second data packet carries the second user plane data, the second data packet is transmitted via a first security connection; and processing, by the terminal, the second control signaling by using a control plane protocol stack if the second data packet is transmitted via the second security connection, or processing, by the terminal, the second user plane data by using a user plane protocol stack if the second data packet is transmitted via the first security connection.

With reference to the third aspect, in some implementations of the third aspect, after the receiving, by the terminal, a second data packet from the security node network element, the method further includes: determining, by the terminal, that the second data packet is transmitted via the first security connection or the second security connection.

With reference to the third aspect, in some implementations of the third aspect, the second data packet further carries an identifier of the second security connection or an identifier of the first security connection, and the determining, by the terminal, that the second data packet is transmitted by using the second security connection or the first security connection includes: when the second data packet further carries the identifier of the second security connection, determining, by the terminal, that the second data packet is transmitted via the second security connection; or when the second data packet further carries the identifier of the first security connection, determining, by the terminal, that the second data packet is transmitted via the first security connection.

With reference to the third aspect, in some implementations of the third aspect, the first security connection may be a first IPsec tunnel, and the second security connection may be a second IPsec tunnel.

With reference to the third aspect, in some implementations of the third aspect, the identifier of the second security connection may be a second SPI value, and the identifier of the first security connection may be a first SPI value.

According to a fourth aspect, a security node network element is provided. The security node network element includes: a first receiving module configured to receive a first data packet from a terminal, where the first data packet carries first user plane data or first control signaling, the first data packet is transmitted via a first security connection or a second security connection, the first security connection is used to transmit the first data packet carrying the first user plane data, and the second security connection is used to transmit the first data packet carrying the first control signaling; and a first sending module, where the first sending module is configured to send the first control signaling to a CP function entity if the first data packet is transmitted via the second security connection; or the first sending module is configured to send the first user plane data to a UP function entity if the first data packet is via the first security connection.

With reference to the fourth aspect, in some implementations of the fourth aspect, each module in the security node network element may further perform a corresponding action performed by the security node network element related to the first aspect, the second aspect, or the third aspect.

According to a fifth aspect, a terminal is provided. The terminal includes: a generation module configured to generate a first data packet, where the first data packet carries first user plane data or first control signaling; and a sending module configured to send the first data packet to the security node network element, where the first data packet is transmitted via a first security connection or a second security connection, the first security connection is used to transmit the first data packet carrying the first user plane data, and the second security connection is used to transmit the first data packet carrying the first control signaling.

With reference to the fifth aspect, in some implementations of the fifth aspect, each module in the terminal may further perform a corresponding action performed by the security node network element related to the first aspect, the second aspect, or the third aspect.

According to a sixth aspect, another security node network element is provided. The security node network element includes: a receiving module configured to receive second control signaling from a CP function entity, or configured to receive second user plane data from a UP function entity; and a sending module configured to send a second data packet to a terminal via a second security connection, where the second data packet carries the second control signaling, or configured to send a second data packet to a terminal via a first security connection, where the data packet carries the second user plane data.

With reference to the sixth aspect, in some implementations of the sixth aspect, each module in the security node network element may further perform a corresponding action performed by the security node network element related to the third aspect.

According to a seventh aspect, a terminal is provided. The terminal includes: a receiving module configured to receive a second data packet from a security node network element, where the data packet carries second control signaling or second user plane data, and when the second data packet carries the control signaling, the second data packet is transmitted via a second security connection, or when the second data packet carries the second user plane data, the second data packet is transmitted via a first security connection; and a processing module, where the processing module is configured to process the second control signaling by using a control plane protocol stack if the second data packet is transmitted via the second security connection; or the processing module is configured to process the second user plane data by using a user plane protocol stack if the second data packet is transmitted via the first security connection.

With reference to the seventh aspect, in some implementations of the seventh aspect, each module in the terminal may further perform a corresponding action performed by the security node network element related to the third aspect.

According to an eighth aspect, still another security node network element is provided. The security node network element includes: a processor, a memory, and a transceiver. The transceiver is configured to receive a first data packet from a terminal, where the first data packet carries first user plane data or first control signaling, the first data packet is transmitted via a first security connection or a second security connection, the first security connection is used to transmit the first data packet carrying the first user plane data, and the second security connection is used to transmit the first data packet carrying the first control signaling. The transceiver is further configured to send the first control signaling to a CP function entity if the first data packet is transmitted via the second security connection; or the transceiver is configured to send the first user plane data to a UP function entity if the first data packet is transmitted via the first security connection.

According to a ninth aspect, still another terminal is provided. The terminal includes a processor 1101, a memory 1102, and a transceiver 1103. The processor 1101 is configured to generate a first data packet, where the first data packet carries first user plane data or first control signaling. The transceiver 1103 is configured to send the first data packet to the security node network element, where the first data packet is transmitted via a first security connection or a second security connection, the first security connection is used to transmit the first data packet carrying the first user plane data, and the second security connection is used to transmit the first data packet carrying the first control signaling.

According to a tenth aspect, still another security node network element is provided. The security node network element includes: a processor, a memory, and a transceiver. The transceiver is configured to receive second control signaling from a CP function entity, or configured to receive second user plane data from a UP function entity. The transceiver is further configured to send a second data packet to a terminal via a second security connection, where the second data packet carries the second control signaling, or configured to send a second data packet to a terminal via a first security connection, where the second data packet carries the second user plane data.

According to an eleventh aspect, still another terminal is provided. The terminal includes: a processor, a memory, and a transceiver. The transceiver is configured to receive a second data packet from a security node network element, where the second data packet carries second control signaling or second user plane data, and when the second data packet carries the second control signaling, the second data packet is transmitted via the second security connection, or when the second data packet carries the second user plane data, the second data packet is transmitted via the first security connection. The processor is configured to process the second control signaling by using a control plane protocol stack if the second data packet is transmitted via the second security connection; or the processor is configured to process the second user plane data by using a user plane protocol stack if the second data packet is transmitted via the first security connection.

According to a twelfth aspect, a computer storage medium is provided. The computer storage medium is configured to store a computer software instruction used by the foregoing security node network element, and the computer software instruction includes a designed program used to perform the foregoing aspect.

According to a thirteenth aspect, a computer storage medium is provided. The computer storage medium is configured to store a computer software instruction used by the foregoing terminal, and the computer software instruction includes a designed program used to perform the foregoing aspect.

According to a fourteenth aspect, a communications system is provided. The system includes the security node network element according to the fourth aspect and the terminal according to the fifth aspect.

According to a fifteenth aspect, a communications system is provided. The system includes the security node network element according to the sixth aspect and the terminal according to the seventh aspect.

According to a sixteenth aspect, a communications system is provided. The system includes the security node network element according to the eighth aspect and the terminal according to the ninth aspect.

According to a seventeenth aspect, a communications system is provided. The system includes the security node network element according to the tenth aspect and the terminal according to the eleventh aspect.

Compared with some approaches, in the embodiments of the present disclosure, a data packet carrying control signaling and a data packet carrying user plane data that are between the security node network element and the terminal are respectively transmitted via different security connections. In this way, the security node identifies whether the data packet carries the control signaling or the user plane data without a need of using a destination IP address that is in the data packet and that a malicious application may modify, but identifies, by using a security connection identifier of a non-application layer, a network layer, or a transport layer, the data packets sent by the different security connections, and identifies, by determining the data packets sent by the different security connections, whether the data packet carries the control signaling or the user plane data. Therefore, modification by the malicious application can be avoided, and transmission security of the user plane data or the control signaling is improved.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following descriptions show merely some embodiments of the present disclosure, and a person of ordinary skill in the art may still derive other drawings from these accompanying drawings without creative efforts.

FIG. 1A is a schematic diagram of a possible application scenario according to an embodiment of the present disclosure;

FIG. 1B is a schematic diagram of a possible network architecture according to an embodiment of the present disclosure;

FIG. 2 is a schematic diagram of a format of a user plane data packet transmitted by using an IPsec tunnel;

DESCRIPTION OF EMBODIMENTS

Figures 3, 4, 5:
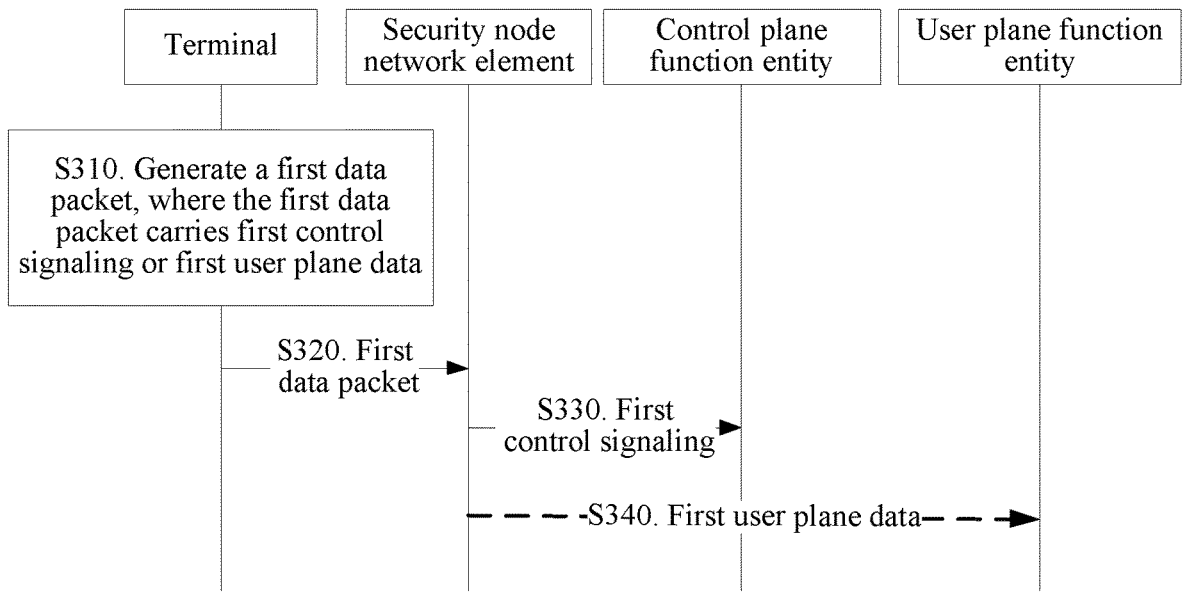
FIG. 3 is a schematic communication diagram of a communication method according to an embodiment of the present disclosure.
FIG. 4 is a schematic diagram of a format of a data packet carrying control signaling according to an embodiment of the present disclosure.
FIG. 5 is a schematic diagram of a format of a data packet carrying user plane data according to an embodiment of the present disclosure.

To make the objectives, technical solutions, and advantages of the embodiments of the present disclosure clearer, the following describes the technical solutions of the embodiments of the present disclosure with reference to the accompanying drawings in the embodiments of the present disclosure.

A network architecture and a service scenario that are described in the embodiments of the present disclosure are intended to describe the technical solutions in the embodiments of the present disclosure more clearly, and do not constitute any limitation on the technical solutions provided in the embodiments of the present disclosure. A person of ordinary skill in the art may learn that with evolution of network architectures and appearance of new service scenarios, the technical solutions provided in the embodiments of the present disclosure are also applicable to similar technical problems.

Some possible application scenarios and network architectures to which the embodiments of the present disclosure are applicable are first described below with reference to FIG. 1A and FIG. 1B.

FIG. 1A shows an application scenario to which the embodiments of the present disclosure may be applicable. As shown in FIG. 1A, a terminal accesses an operator IP service network, such as a multimedia subsystem (IMS) network or a Packet Switched Streaming Service (PSS) network, by using a radio access network (RAN) and a core network (CN). The technical solutions described in the embodiments of the present disclosure may be applicable to a Long Term Evolution (LTE) system, or other wireless communications systems in which various wireless access technologies are used, for example, systems in which access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA) are used. Moreover, the technical solutions may be further applicable to a subsequent evolved system of the LTE system, for example, a 5th Generation (5G) system. For the purpose of clarity, only the LTE system is used herein as an example for description. In the LTE system, an evolved universal terrestrial RAN (E-UTRAN) is used as the RAN, and an evolved packet core (EPC) is used as the core network. The terminal accesses the IMS network by using the E-UTRAN and the EPC. It should be noted that, when the solutions of the embodiments of the present disclosure are applied to the 5G system or another system that may occur in future, a name of the terminal or a network device may change, but this does not affect implementation of the solutions of the embodiments of the present disclosure.

Based on the foregoing application scenario, FIG. 1B shows a possible network architecture provided in an embodiment of the present disclosure. As shown in FIG. 1B, the network architecture includes at least: a terminal, an access network, a security node network element, a CP function entity, and a UP function entity. The terminal accesses the security node network element by using the access network, and the security node network element is connected to both the CP function entity and the UP function entity. Uplink and downlink data packets are transmitted between the terminal and the security node network element by using a security connection, and the security connection may be an IPsec tunnel, or may be another security connection manner. For convenience of description, the CP function entity may also be described as a CP function, and the UP function entity may also be described as a UP function.

It should be understood that, the technical solutions of the present disclosure are not limited to the network architecture shown in FIG. 1B, and all network architectures in which control signaling is transmitted by using a user plane security connection, for example, an LTE network, a home NodeB network, a mobile network of Wireless Fidelity (WI-FI) access, a Global System for Mobile Communications (GSM) network, a Wideband Code Division Multiple Access (WCDMA) network, a 5G network, or another network that may occur in future, are applicable to the present disclosure.

In the embodiments of the present disclosure, terms "network" and "system" are usually alternately used, but a person skilled in the art may understand meanings of the terms.

The terminal related to the embodiments of the present disclosure may include various handheld devices, in-vehicle devices, wearable devices, and computing devices that have a wireless communication function, or other processing devices connected to a wireless modem, and various forms of user equipment (UE), mobile stations (MS), terminal devices, and the like. For convenience of description, the foregoing devices are collectively referred to as terminals.

The security node network element related to the embodiments of the present disclosure may be a core network element (for example, a non-3GPP core network gateway (N3CNGW)), a non-3GPP access stratum function (N3ASF) entity, or an access gateway (AGW) in a 3rd Generation Partnership Project (3GPP) mobile network; may be a core network element in an LTE system or a wireless controller in a cloud RAN (CRAN); may be a relay station, an access point, an in-vehicle device, or a wearable device; or may be a network device in a 5G network, a network device in a future evolved public land mobile network (PLMN), or the like. This is not limited in the embodiments of the present disclosure.

It may be understood that, in the implementations of the present disclosure, serial numbers "first" and "second" are merely intended to distinguish between different objects, for example, distinguish between different security connections, and should not constitute any limitation on the protection scope of the embodiments of the present disclosure.

The embodiments of the present disclosure are further described in detail below based on the foregoing commonality related to the embodiments of the present disclosure.

In the network architecture shown in FIG. 1B, when control signaling is transmitted between the terminal and the security node network element, the control signaling needs to be transmitted via a user plane security connection between the terminal and the security node network element. For example, when receiving an uplink data packet sent by the terminal, the security node network element needs to identify whether the uplink data packet carries control signaling. If the uplink data packet carries control signaling, the security node network element extracts the control signaling and sends the control signaling to the CP function; or if the uplink data packet carries user plane data, the security node network element sends the user plane data in the uplink data packet to the UP function. For a downlink data packet, after receiving the downlink data packet, the terminal identifies whether the downlink data packet carries control signaling. If the downlink data packet carries control signaling, the terminal extracts the control signaling and submits the control signaling to a control plane protocol stack for processing, or if the downlink data packet carries user plane data, the terminal extracts the user plane data and submits the user plane data to a user plane protocol stack for processing.

In an existing solution, a data packet carrying control signaling may be identified in a manner of setting a destination IP address of the data packet to a specific destination IP address. FIG. 2 shows a format of a data packet of security connection data transmitted by using IPsec. Using the format of the data packet as an example, in an uplink transmission process, the security node network element determines, by identifying whether the data packet includes a specific destination IP address, whether the data packet carries control signaling, where the specific destination IP address may be configured in advance. When the security node network element identifies that the data packet includes the specific destination IP address, the security node network element may determine that the data packet carries control signaling. However, this manner has a security problem. For example, in practice, a destination IP address of a data packet carrying no control signaling may be set by a malicious application in a terminal to a specific destination IP address. Consequently, considered as control signaling, user plane data carried in the data packet is sent to a CP function, causing an error.

In view of this, the embodiments of the present disclosure provide a communication method, and a security node network element, a terminal, and a system that are based on the method. The method includes: generating, by a terminal, a first data packet, where the first data packet carries first user plane data or first control signaling; sending, by the terminal, the first data packet to a security node network element, where the first data packet is transmitted via a first security connection or a second security connection, the first security connection is used to transmit the first data packet carrying the first user plane data, and the second security connection is used to transmit the first data packet carrying the first control signaling; and after the security node network element receives the first data packet, if the first data packet is transmitted via the first security connection, sending, by the security node network element, the first control signaling to a CP function entity; or if the first data packet is transmitted via the second security connection, sending, by the security node network element, the first user plane data to a UP function entity.

With reference to FIG. 3, the following describes the solutions provided in the embodiments of the present disclosure.

FIG. 3 shows a communication method provided in an embodiment of the present disclosure. The method shown in FIG. 3 may include a part S310 to a part S330, or the method shown in FIG. 3 may include a part S310, a part S320, and a part S330.

S310. A terminal generates a first data packet, where the first data packet carries first user plane data or first control signaling.

Optionally, in some implementations, the first data packet may be a data packet in a format of an IPsec user plane data packet, and the data packet carries the first user plane data or the first control signaling.

It should be understood that, in this implementation of the present disclosure, when the terminal needs to send the first control signaling to a CP function entity, the terminal may generate the first data packet carrying the first control signaling; or when the terminal needs to send the first user plane data to a UP function entity, the terminal may generate the first data packet carrying the first user plane data.

S320. The terminal sends the first data packet to the security node network element, where the first data packet is transmitted via a first security connection or a second security connection, the first security connection is used to transmit the first data packet carrying the first user plane data, and the second security connection is used to transmit the first data packet carrying the first control signaling.

Specifically, in this implementation of the present disclosure, when the first data packet carries the first control signaling, the terminal may send the first data packet to the security node network element via the second security connection; or when the first data packet carries the first user plane data, the terminal may send the first data packet to the security node network element via the first security connection.

Optionally, in some implementations, the first security connection and the second security connection may be different security connection forms. For example, the first security connection and the second security connection may be IPsec tunnels. Specifically, the first security connection may be a first IPsec tunnel, and the second security connection may be a second IPsec tunnel. For another example, the first security connection and the second security connection may be LTE tunnels. Specifically, the first security connection may be a first LTE tunnel, and the second security connection may be a second LTE tunnel. For another example, the first security connection and the second security connection may be different security connections. For example, the first security connection may be an IPsec tunnel, and the second security connection may be an LTE tunnel.

Optionally, in some implementations, if the first data packet carries the first control signaling, the first data packet may further carry an identifier of the second security connection; or if the first data packet carries the first user plane data, the first data packet may further carry an identifier of the first security connection.

Optionally, in some implementations, the identifier of the second security connection may be a second SPI value, and the identifier of the first security connection may be a first SPI value.

A data packet carrying control signaling and a data packet carrying user plane data that are between the security node network element and the terminal are respectively transmitted via different security connections. In this way, the security node identifies the data packet carrying the control signaling or the user plane data without a need of using a specific destination IP address that is added to the data packet and that a malicious application may modify, but identifies, by using a security connection identifier of a non-application layer, the data packets sent via the different security connections, so as to identify, based on the data packets sent via the different security connections, the data packet carrying the control signaling or the user plane data. Therefore, transmission security of the user plane data or the control signaling is improved.

It should be understood that, in this implementation of the present disclosure, the terminal generates the first data packet, the first data packet is sent to the security node network element via the first security connection or the second security connection, and the first data packet may be a data packet corresponding to a type of the first security connection or the second security connection. For example, when the first security connection is a first IPsec tunnel or the second security connection is a second IPsec tunnel, the first data packet generated by the terminal is in the format of an IPsec user plane data packet; or when the first security connection or the second security connection is an LTE tunnel, the first data packet generated by the terminal is in a format of a user plane data packet that is corresponding to the LTE tunnel.

Optionally, in some implementations, the terminal may further receive a second data packet from the security node network element, where the second data packet carries second control signaling or second user plane data. When the second data packet carries the second control signaling, the second data packet is transmitted via the second security connection; or when the second data packet carries the second user plane data, the second data packet is transmitted via the first security connection. If the second data packet is transmitted via the second security connection, the terminal processes the second control signaling by using a control plane protocol stack; or if the second data packet is transmitted via the first security connection, the terminal processes the second user plane data by using a user plane protocol stack.

Optionally, in some implementations, when the second data packet carries the second control signaling, the second data packet may further carry the identifier of the second security connection; or when the second data packet carries the second user plane data, the second data packet may further carry the identifier of the first security connection.

Optionally, in some implementations, after receiving the second data packet from the security node network element, the terminal may further first determine that the second data packet is transmitted via the second security connection or the first security connection. For example, when the second data packet further carries the identifier of the second security connection, the terminal may determine that the second data packet is transmitted via the second security connection; or when the second data packet further carries the identifier of the first security connection, the terminal may determine that the second data packet is transmitted via the first security connection.

In the foregoing implementation, the security node network element may send the second data packet carrying the second control signaling to the terminal via the second security connection; or the security node network element may send the second data packet carrying the second user plane data to the terminal via the first security connection.

Optionally, in some embodiments, before sending the second data packet to the terminal, the security node network element may further first receive the second control signaling from the CP function entity; or the security node network element may further first receive the second user plane data from the UP function entity.

Optionally, in some implementations, after the security node network element receives the first data packet from the terminal, the security node network element may further determine that the first data packet is transmitted via the second security connection or the first security connection. For example, when the first data packet further carries the identifier of the second security connection, the security node network element may determine that the first data packet is transmitted via the second security connection; or when the first data packet further carries the identifier of the first security connection, the security node network element may determine that the first data packet is transmitted via the first security connection.

It should be noted that, the following parts S330 and S340 are optional parts, and after the part S320 is performed, the part S330 or the part S340 is performed. Specifically, if the first data packet is transmitted via the second security connection, the part S330 is performed; or if the first data packet is transmitted via the first security connection, the part S340 is performed.

S330. The security node network element sends the first control signaling to a CP function entity if the first data packet is transmitted via the second security connection.

Specifically, the security node network element may extract the first control signaling carried in the first data packet, and send the first control signaling to the CP function entity.

S340. The security node network element sends the first user plane data to a UP function entity if the first data packet is transmitted via the first security connection.

Specifically, the security node network element may extract the first user plane data in the first data packet, and send the first user plane data to the UP function entity.

In this embodiment of the present disclosure, when the first data packet carries the first control signaling, the first data packet is transmitted via the first security connection; or when the first data packet carries the first user plane data, the first data packet is transmitted via the second security connection, so that the security node network element may determine, based on a security connection used to transmit the first data packet, that the first data packet carries the first control signaling or the first user plane data. If the first data packet is transmitted via the second security connection, the security node network element may determine that the first data packet carries the first control signaling, and send the first control signaling to the CP function entity; or if the first data packet is transmitted via the first security connection, the security node network element may determine that the first data packet carries the first user plane data, and send the first user plane data to the UP function entity. It can be learned that, in this embodiment of the present disclosure, control signaling and user plane data are transmitted via different security connections, so that the security node network element identifies whether a data packet carries the control signaling. Compared with a manner in which a specific destination IP address is set in a data packet, the solution of this embodiment of the present disclosure improves transmission security of the user plane data or the control signaling.

A format of the first data packet in this embodiment of the present disclosure is described below based on the method shown in FIG. 3, by using an example in which the first security connection is a first IPsec tunnel and the second security connection is a second IPsec tunnel, and with reference to FIG. 4 and FIG. 5.

FIG. 4 is a schematic diagram of a format of a first data packet carrying first control signaling, where the first data packet may be in a format of an IPsec user plane data packet.

When a terminal needs to send first control signaling to a CP function entity, the terminal generates a first data packet. The first data packet includes a security parameter connection parameter index, such as a second SPI, of a second IPsec tunnel. After receiving the first data packet, a security node network element may identify, by using the second SPI in the first data packet, that the first data packet is sent by the terminal via the second IPsec tunnel, so as to determine that the first data packet carries the first control signaling, and extract the first control signaling from the first data packet.

FIG. 5 is a schematic diagram of a format of a first data packet carrying first user plane data, where the first data packet may be in a format of an IPsec user plane data packet.

When a terminal needs to send first user plane data to a UP function entity, the terminal generates a first data packet. The first data packet includes an SPI, such as a first SPI, of a first IPsec tunnel. After receiving the first data packet, a security node network element may identify, by using the first SPI in the first data packet, that the data packet is sent via the first IPsec tunnel, so as to determine that the first data packet carries the first user plane data, and extract the first user plane data from the first data packet.

The security node network element may identify, based on a SPI value carried in the first data packet, the first data packet sent by using different IPsec tunnels, so as to determine whether the first data packet carries the first control signaling or the first user plane data. The SPI value is a security connection identifier of a non-application layer. Therefore, modification by a malicious application can be avoided, and transmission security is improved.

Optionally, in some implementations, before the method shown in FIG. 3 is performed, the method of this embodiment of the present disclosure may further include establishing the first security connection and the second security connection.

Specifically, in the foregoing implementation, the first security connection may be a first IPsec tunnel, and the second security connection may be a second IPsec tunnel. The first IPsec tunnel may be established in a terminal attach process, and after the first IPsec tunnel is established, the second IPsec tunnel may continue to be established by using a key and an algorithm that are negotiated upon in a process of establishing the first IPsec tunnel.

A process of establishing a first IPsec tunnel and a second IPsec tunnel in an embodiment of the present disclosure is described below by using an example in which a first security connection is a first IPsec tunnel, a second security connection is a second IPsec tunnel, and a security node network element is an N3CNGW, and with reference to FIG. 6. It should be understood that, in this implementation of the present disclosure, the first security connection and the second security connection may be alternatively another form of tunnel or another form of security connection. This is not limited in this embodiment of the present disclosure, and a person skilled in the art may establish another form of security connection without creative efforts.

Figure 6:
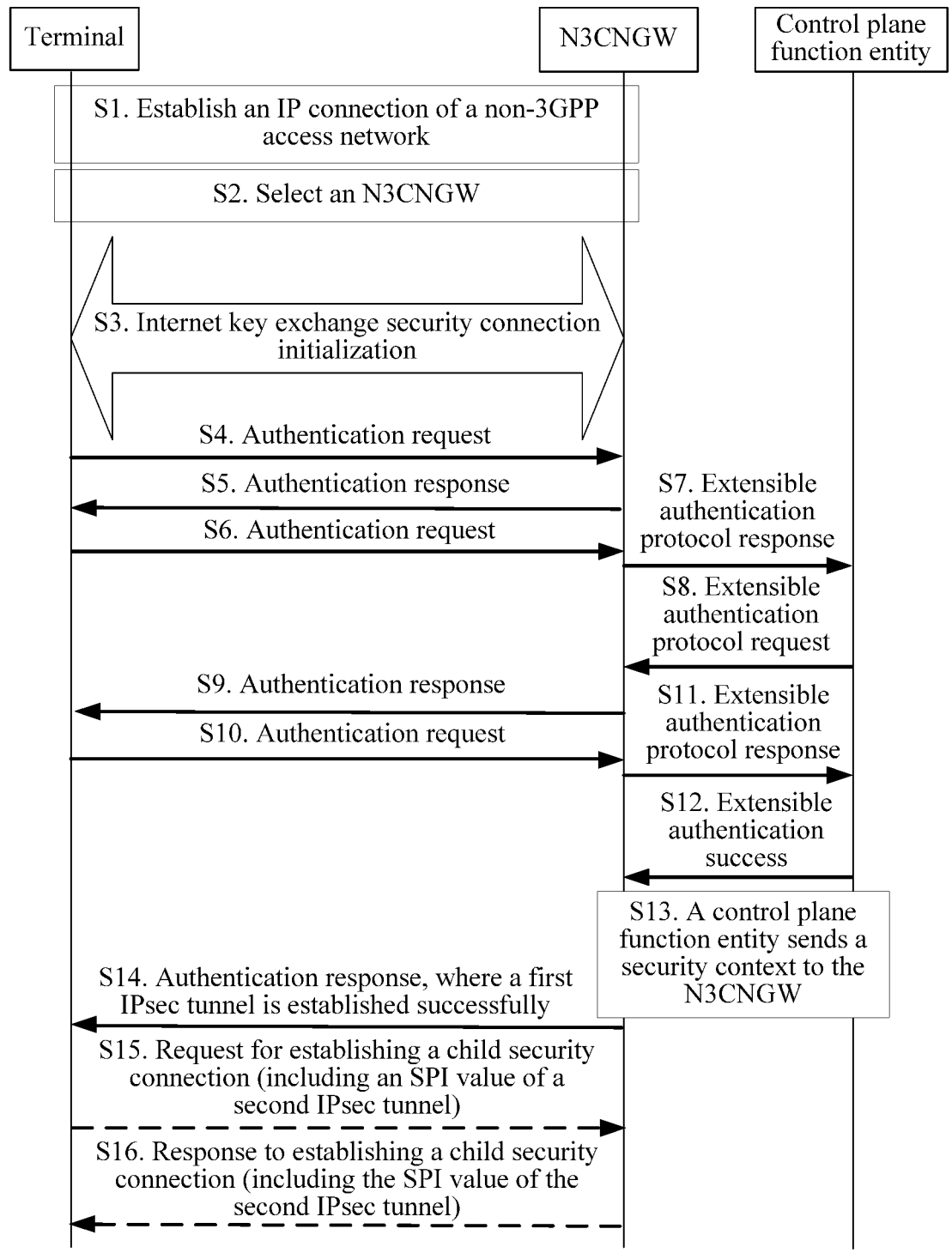
FIG. 6 is a schematic communication diagram of establishing a first IPsec tunnel and a second IPsec tunnel according to an embodiment of the present disclosure.

FIG. 6 is a schematic flowchart of establishing a first IPsec tunnel and a second IPsec tunnel between a terminal and an N3CNGW according to an embodiment of the present disclosure.

In S1, a terminal establishes an IP connection to a non-3GPP access network.

In S2, the terminal selects a non-3GPP core network element N3CNGW.

In S3, the terminal performs Internet key exchange security connection initialization between the terminal and the N3CNGW selected in step S2.

In step S3, the terminal obtains a SPI of a security connection by performing signaling interaction between the terminal and the N3CNGW.

In S4, the terminal sends an authentication request to the N3CNGW, where the authentication request includes an identifier of the terminal.

In S5, the N3CNGW sends an authentication response to the terminal, where the authentication response includes an identifier of the N3CNGW.

In S6, the terminal sends an authentication request to the N3CNGW again, where the authentication request includes EAP-RSP signaling, the EAP-RSP includes an answer message used to verify, in an EAP authentication process, whether the terminal is legal.

In S7, the N3CNGW sends an extensible authentication protocol response to a CP function entity, where the extensible authentication protocol response includes the EAP-RSP signaling.

In S8, the CP function entity sends an extensible authentication protocol request to the N3CNGW, where the extensible authentication protocol request includes EAP-RSQ, and the EAP-RSQ is signaling in the EAP authentication process.

In S9, the N3CNGW sends an authentication response to the terminal, where the authentication response includes the identifier of the N3CNGW and the EAP-RSP, and the EAP-RSP is signaling in the EAP authentication process.

In S10, the terminal sends an authentication request to the N3CNGW.

In S11, the N3CNGW sends an extensible authentication protocol response to the CP function entity.

In S12, the CP function entity sends extensible authentication success signaling to the N3CNGW.

In S13, the CP function entity obtains security context information by performing signaling interaction between the CP function entity and the N3CNGW.

In S14, the N3CNGW sends an authentication response to the terminal, where information about the response includes a message indicating that a first IPsec tunnel is established successfully.

In S15, the terminal sends, to the N3CNGW, a request for establishing a child security connection, where the request includes an SPI value of a second IPsec tunnel.

In S16, the N3CNGW sends, to the terminal, a response to establishing a child security connection, where the response includes the SPI value of the second IPsec tunnel.

After the foregoing steps are performed, the first IPsec tunnel and the second IPsec tunnel are established between the terminal and the N3CNGW. It should be understood that, in this implementation of the present disclosure, the second IPsec tunnel is established based on the first IPsec tunnel, that is, the second IPsec tunnel may be established by using a key and an algorithm that are negotiated upon in a process of establishing the first IPsec tunnel. Certainly, a person skilled in the art may easily conceive without creative efforts that a process of establishing the second IPsec tunnel may be the same as the process of establishing the first IPsec tunnel, that is, two totally different IPsec tunnels may be separately established.

It should be further understood that, in this implementation of the present disclosure, the second IPsec tunnel may be established based on the first IPsec tunnel. In this case, when a data packet is transmitted between the terminal and the security node network element, a data packet carrying control signaling may be transmitted via the first IPsec tunnel, and/or a data packet carrying user plane data may be transmitted via the second IPsec tunnel. This is not limited in the present disclosure.

It should be further understood that, in this implementation of the present disclosure, the first IPsec tunnel and the second IPsec tunnel may be established independent of each other. In this case, serial numbers "first" and "second" are merely intended to distinguish between different IPsec tunnels, and should not constitute any limitation on the protection scope of the embodiments of the present disclosure.

In the network architecture shown in FIG. 1B, when receiving a downlink data packet, the terminal needs to identify whether the downlink data packet carries control signaling. If the downlink data packet carries control signaling, the terminal extracts the control signaling and processes the control signaling by using a control plane protocol stack; or if the downlink data packet carries user plane data, the terminal processes the user plane data in the downlink data packet by using a user plane protocol stack. Similar to transmission of an uplink data packet, in an existing solution, a destination IP address of a downlink data packet carrying no control signaling may also be set by a malicious application in the terminal to a specific destination IP address. Consequently, user plane data carried in the downlink data packet is processed by using the control plane protocol stack, causing an error. In view of this, the embodiments of the present disclosure provide another communication method, and a security node network element, a terminal, and a system that are based on the method. The method includes: receiving, by a security node network element, second control signaling from a CP function entity, or receiving, by a security node, second user plane data from a UP function entity; sending, by the security node network element, a second data packet to a terminal, where the second data packet carries the second control signaling or the second user plane data, and when the second data packet carries the second control signaling, the second data packet is transmitted via a second security connection, or when the second data packet carries the second user plane data, the second data packet is transmitted via a first security connection; and processing, by the terminal, the second control signaling by using a control plane protocol stack if the second data packet is transmitted via the second security connection, or processing, by the terminal, the second user plane data by using a user plane protocol stack if the second data packet is transmitted via the first security connection.

Figure 7:
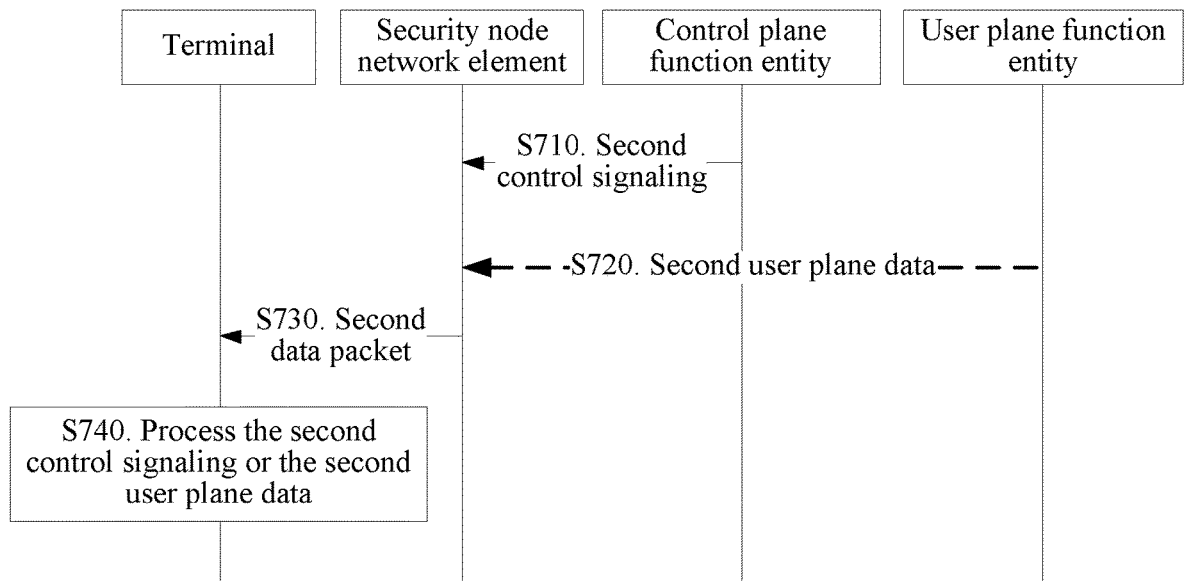
FIG. 7 is a schematic communication diagram of another communication method according to an embodiment of the present disclosure.

A communication method provided in an embodiment of the present disclosure is described below with reference to FIG. 7. The method shown in FIG. 7 may be performed based on the method shown in FIG. 3, or may be performed not based on the method shown in FIG. 3. As shown in FIG. 7, the communication method includes the following steps.

S710. A security node network element receives second control signaling from a CP function entity.

Specifically, in S710, when the CP function entity needs to send the second control signaling to a terminal, the CP function entity sends the second control signaling to the security node network element. The second control signaling may include a non-access stratum (NAS) signaling and the like. This is not limited in the present disclosure.

Optionally, in some implementations, after the security node network element receives the second control signaling sent by the CP function entity, the security node network element may generate a second data packet carrying the second control signaling.

S720. The security node network element receives second user plane data from a UP function entity.

Specifically, in S720, when the UP function entity needs to send the second user plane data to the terminal, the UP function entity sends the second user plane data to the security node network element.

Optionally, in some embodiments, after the security node network element receives the second user plane data sent by the UP function entity, the security node network element may generate a second data packet carrying the second user plane data.

It should be noted that, the foregoing parts S710 and S720 are optional parts. When S710 is performed, steps of content corresponding to the part S710 are separately performed in the following parts S730 and S740. When the part S720 is performed, steps of content corresponding to the part S720 are separately performed in the following parts S730 and S740.

Optionally, in some implementations, after the security node network element performs step S710 of receiving the second control signaling sent by the CP function entity, the security node network element generates a second data packet based on the second control signaling, where the second data packet carries the second control signaling.

Specifically, after receiving the second control signaling sent by the CP function entity, the security node network element generates a second data packet based on a type of a security connection for transmitting the second data packet, where the second data packet includes the second control signaling sent by the CP function entity.

Optionally, in some embodiments, after the security node network element performs step S720 of receiving the second user plane data sent by the UP function entity, the security node network element generates a second data packet based on the second user plane data, where the second data packet carries the second user plane data.

Specifically, after receiving the second user plane data sent by the UP function entity, the security node network element generates a second data packet based on a type of a security connection for transmitting the second data packet, where the second data packet includes the second user plane data sent by the UP function entity.

Optionally, in some implementations, when the second data packet carries the second control signaling, the second data packet further carries an identifier of the second security connection; or when the second data packet carries the second user plane data, the second data packet may further carry an identifier of the first security connection. That is, when the S710 is performed, the second data packet generated by the security node network element further carries the identifier of the second security connection; or when S720 is performed, the second data packet generated by the security node network element further carries the identifier of the first security connection.

S730. The security node network element sends a second data packet to a terminal, where the second data packet carries the second control signaling or the second user plane data, and when the second data packet carries the second control signaling, the second data packet is transmitted via a second security connection; or when the second data packet carries the second user plane data, the second data packet is transmitted via a first security connection.

Optionally, in some implementations, after the terminal receives the second data packet from the security node network element, the terminal may further determine that the second data packet is transmitted via the second security connection or the first security connection. For example, when the second data packet further carries the identifier of the second security connection, the security node network element may determine that the second data packet is transmitted via the second security connection; or when the second data packet further carries the identifier of the first security connection, the security node network element may further determine that the second data packet is transmitted via the first security connection.

Specifically, in this implementation of the present disclosure, when identifying that a security connection identifier carried in the second data packet is the identifier of the first security connection, the terminal determines that the first security connection is a security connection used by the security node network element to send the second data packet; or when identifying that a security connection identifier carried in the first data packet is the identifier of the first security connection, the terminal determines that the first security connection is a security connection used by the security node network element to send the first data packet.

S740. The terminal processes the second control signaling or the second user plane data in the second data packet, where if the second data packet is transmitted via the second security connection, the terminal processes the second control signaling by using a control plane protocol stack; or if the second data packet is transmitted via the first security connection, the terminal processes the second control signaling by using a user plane protocol stack.

Specifically, in this implementation of the present disclosure, the terminal receives the second data packet sent by the security node network element, and determines, by using a security connection identifier in the second data packet, that the second data packet is sent via the second security connection, or sent via the first security connection. That is, the terminal identifies, based on the security connection identifier in the second data packet, that a security connection for sending the second data packet is the second security connection or the first security connection. When the terminal identifies that the second data packet is sent via the second security connection, the terminal obtains the second control signaling in the second data packet, and submits the second control signaling to the control plane protocol stack for processing; or when the terminal identifies that the second data packet is sent via the first security connection, the terminal obtains the second user plane data in the second data packet, and submits the second user plane data to the user plane protocol stack for processing.

It should be noted that, in the method shown in FIG. 7, for content related to the first security connection, the second security connection, the identifier of the first security connection, and the identifier of the second security connection, reference may be made to the detailed descriptions in FIG. 3. Details are not described herein.

User plane data and control signaling are respectively transmitted via two different security connections. When the control signaling is transmitted, a data packet carrying the control signaling is transmitted via the second security connection, and a data packet carrying the user plane data is transmitted via the first security connection. After receiving a data packet, the security node network element or the terminal identifies, by using a target security connection identifier in the data packet, a target security connection for sending the data packet, and determines, based on the target security connection for transmitting the data packet, whether the data packet carries the user plane data or the control signaling. The target security connection identifier is an identifier of a non-application layer, a network layer, or a transport layer. Therefore, modification by a malicious application can be avoided, and transmission security is improved.

It should be understood that, in this implementation of the present disclosure, the sequence numbers in the foregoing procedures do not mean an execution sequence, and the execution sequence of the procedures should be determined based on functions and internal logic thereof, and should not constitute any limitation on the implementation process of this embodiment of the present disclosure.

The communication methods in the embodiments of the present disclosure are described in detail above from a perspective of interaction, and a security node network element and a terminal used for communication in the embodiments of the present disclosure are described in detail below.

Figure 8:
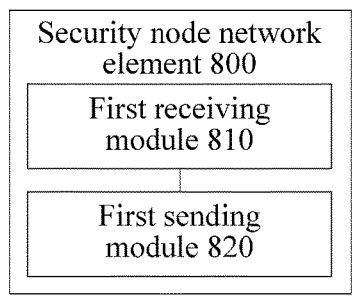
FIG. 8 is a schematic block diagram of a security node network element according to an embodiment of the present disclosure.

FIG. 8 is a schematic block diagram of a security node network element according to an embodiment of the present disclosure. Functional modules of the security node network element may correspondingly perform steps and/or procedures performed by the security node network element related to the methods shown in FIG. 3, FIG. 6, and FIG. 7. The security node network element includes: a first receiving module 810 configured to receive a first data packet from a terminal, where the first data packet carries first user plane data or first control signaling, the first data packet is transmitted via a first security connection or a second security connection, the first security connection is used to transmit the first data packet carrying the first user plane data, and the second security connection is used to transmit the first data packet carrying the first control signaling; and a first sending module 820, where the first sending module is configured to send the first control signaling to a CP function entity if the first data packet is transmitted via the second security connection; or the first sending module is configured to send the first user plane data to a UP function entity if the first data packet is transmitted via the first security connection.

A data packet carrying control signaling and a data packet carrying user plane data that are between the security node network element and the terminal are respectively transmitted via different security connections. In this way, the security node identifies whether the data packet carries the control signaling or the user plane data without a need of using a specific destination IP address that is in the data packet and that a malicious application may modify, but identifies, by using a security connection identifier of a non-application layer, a network layer, or a transport layer, the data packets sent by the different security connections, and identifies, by determining the data packets sent by the different security connections, whether the data packet carries the control signaling or the user plane data. Therefore, modification by the malicious application may be avoided, and transmission security of the user plane data or the control signaling is improved.

Optionally, in some implementations, the security node network element further includes: a second sending module, where the second sending module is configured to send a second data packet to the terminal via the second security connection, where the second data packet carries second control signaling; or the second sending module is configured to send a second data packet to the terminal via the first security connection, where the second data packet carries second user plane data.

Optionally, in some implementations, the security node network element further includes: a second receiving module, where the second receiving module is configured to receive the second control signaling from the CP function entity, or the second receiving module is configured to receive the second user plane data from the UP function entity.

Optionally, in some implementations, when the second data packet carries the second control signaling, the second data packet further carries an identifier of the second security connection; or when the second data packet carries the second user plane data, the second data packet further carries an identifier of the first security connection.

Optionally, in some implementations, the security node network element further includes a determining module configured to: after the first receiving module receives the first data packet, determine that the first data packet is transmitted via the second security connection or the first security connection.

Optionally, in some implementations, the first data packet further carries the identifier of the second security connection or the identifier of the first security connection, and the determining module is specifically configured to: when the first data packet further carries the identifier of the second security connection, determine that the first data packet is transmitted via the second security connection; or when the first data packet further carries the identifier of the first security connection, determine that the first data packet is transmitted via the first security connection.

Optionally, in some implementations, the first security connection is a first IPsec tunnel, and the second security connection is a second IPsec tunnel.

Optionally, in some implementations, the identifier of the second security connection is a second SPI value, and the identifier of the first security connection is a first SPI value.

It should be understood that, the security node network element herein is embodied in a form of a functional module. The term "module" herein may be an application-specific integrated circuit, an electronic circuit, a processor (for example, a shared processor, a dedicated processor, or a group of processors) configured to execute one or more software or firmware programs, a memory, a merging logic circuit, and/or another appropriate component supporting the described function. The security node network element may be configured to perform procedures and/or steps corresponding to the security node network element in the foregoing method embodiments. To avoid repetition, details are not described herein again.

Figure 9:
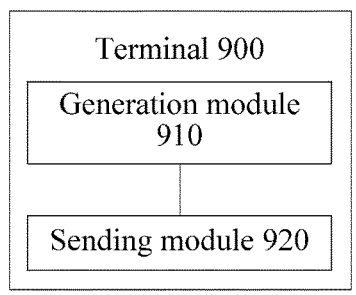
FIG. 9 is a schematic block diagram of a terminal according to an embodiment of the present disclosure.

FIG. 9 is a schematic block diagram of a terminal according to an embodiment of the present disclosure. Functional modules of the terminal may correspondingly perform steps and/or procedures performed by the terminal related to the methods shown in FIG. 3, FIG. 6, and FIG. 7. The terminal includes: a generation module 910 configured to generate a first data packet, where the first data packet carries first user plane data or first control signaling; and a sending module 920 configured to send the first data packet to the security node network element, where the first data packet is transmitted via a first security connection or a second security connection, the first security connection is used to transmit the first data packet carrying the first user plane data, and the second security connection is used to transmit the first data packet carrying the first control signaling.

A data packet carrying control signaling and a data packet carrying user plane data that are between the security node network element and the terminal are respectively transmitted via different security connections. In this way, the terminal identifies that the data packet carries the control signaling or the user plane data without a need of using a specific destination IP address that is in the data packet and that a malicious application may modify, but identifies, by using a security connection identifier of a non-application layer, the data packets sent by the different security connections, so as to identify, based on the data packets sent by the different security connections, the data packet carrying the control signaling or the user plane data. Therefore, transmission security of the user plane data or the control signaling is improved.

Optionally, in some implementations, the terminal further includes: a receiving module configured to receive a second data packet from the security node network element, where the second data packet carries second control signaling or second user plane data, and when the second data packet carries the second control signaling, the second data packet is transmitted via the second security connection, or when the second data packet carries the second user plane data, the second data packet is transmitted via the first security connection; and a processing module, where the processing module is configured to process the second control signaling by using a control plane protocol stack if the second data packet is transmitted via the second security connection; or the processing module is configured to process the second user plane data by using a user plane protocol stack if the second data packet is transmitted via the first security connection.

Optionally, in some implementations, the terminal further includes: a determining module configured to: after the receiving module receives the second data packet from the security node network element, determine that the second data packet is transmitted via the second security connection or the first security connection.

Optionally, in some implementations, the second data packet further carries an identifier of the second security connection or an identifier of the first security connection, and the determining module is specifically configured to: when the second data packet further carries the identifier of the second security connection, determine that the second data packet is transmitted via the second security connection; or when the second data packet further carries the identifier of the first security connection, determine that the second data packet is transmitted via the first security connection.

Optionally, in some implementations, if the first data packet carries the first control signaling, the first data packet further carries the identifier of the second security connection; or if the first data packet carries the first user plane data, the first data packet further carries the identifier of the first security connection.

Optionally, in some implementations, the first security connection is a first IPsec tunnel, and the second security connection is a second IPsec tunnel.

Optionally, in some implementations, the identifier of the second security connection is a second SPI value, and the identifier of the first security connection is a first SPI value.

It should be understood that, the terminal herein is embodied in a form of a functional module. The term "module" herein may be an application-specific integrated circuit, an electronic circuit, a processor (for example, a shared processor, a dedicated processor, or a group of processors) configured to perform one or more software or firmware programs, a memory, a merging logic circuit, and/or another appropriate component supporting the described function. The terminal may be configured to perform procedures and/or steps corresponding to the terminal in the foregoing method embodiments. To avoid repetition, details are not described herein again.

Figure 10:
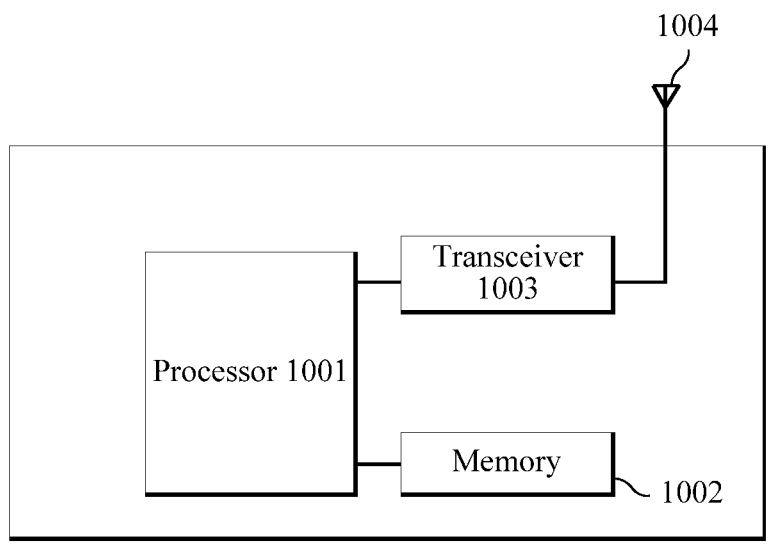
FIG. 10 is a schematic block diagram of another security node network element according to an embodiment of the present disclosure.

FIG. 10 is a schematic block diagram of another security node network element according to an embodiment of the present disclosure. Components of the security node network element may correspondingly perform steps and/or procedures performed by the security node network element related to the methods shown in FIG. 3, FIG. 6, and FIG. 7. The security node network element includes a processor 1001, a memory 1002, and a transceiver 1003. Components of the security node network element are connected together in a coupling manner. The transceiver 1003 receives and sends data by using an antenna 1004.

The methods disclosed in the foregoing embodiments of the present disclosure may be applied to the processor 1001, or are implemented by the processor 1001. The processor 1001 may be an integrated circuit chip and has a signal processing capability. In an implementation process, the steps in the foregoing methods may be performed by using an integrated logic circuit of hardware in the processor 1001 or an instruction in a form of software. The processor 1001 may be a general purpose processor, a system-on-a-chip (SOC), a baseband processor, a digital signal processor (DSP), an application-specific integrated circuit (ASIC), a field programmable gate array (FPGA) or another programmable logic device, a discrete gate or transistor logic device, or a discrete hardware component. The processor may implement or perform methods, steps, and logical block diagrams disclosed in the embodiments of the present disclosure. The general purpose processor may be a microprocessor, or the processor may be any conventional processor or the like. Steps of the methods disclosed in the embodiments of the present disclosure may be directly performed and completed by a hardware decoding processor, or may be performed and completed by using a combination of hardware and software modules in a decoding processor. The software module may be located in a mature storage medium in the art, such as a random access memory (RAM), a flash memory, a read-only memory (ROM), a programmable ROM, an electrically erasable programmable memory, or a register. The storage medium is located in the memory 1002. The processor 1001 reads an instruction in the memory 1002, and performs the steps of the foregoing methods in combination with hardware of the processor.

The transceiver 1003 is configured to receive a first data packet from a terminal, where the first data packet carries first user plane data or first control signaling, the first data packet is transmitted via a first security connection or a second security connection, the first security connection is used to transmit the first data packet carrying the first user plane data, and the second security connection is used to transmit the first data packet carrying the first control signaling; and the transceiver 1003 is further configured to send the first control signaling to a CP function entity if the first data packet is transmitted via the second security connection; or the transceiver 1003 is configured to send the first user plane data to a UP function entity if the first data packet is transmitted via the first security connection.

Based on the security node network element in this implementation of the present disclosure, the first data packet needs to be transmitted via the first security connection or the second security connection, and the first data packet needs to be verified with a target security connection. That is, when a target security connection identifier in the first data packet is a security connection identifier corresponding to the first security connection, the first data packet can be transmitted only via the first security connection; or when a target security connection identifier in the first data packet is a security connection identifier corresponding to the second security connection, the first data packet can be transmitted only via the second security connection. The security connection identifier is an identifier of a non-application layer, a network layer, or a transport layer, so that a malicious application may be prevented from modifying the layer identifier, and transmission security is improved.

Optionally, in some implementations, the transceiver 1003 of the security node network element is further configured to: send a second data packet to the terminal via the second security connection, where the second data packet carries second control signaling; or send a second data packet to the terminal via the first security connection, where the second data packet carries second user plane data.

Optionally, in some implementations, the transceiver 1003 of the security node network element is further configured to receive the second control signaling from the CP function entity; or configured to receive the second user plane data from the UP function entity.

Optionally, in some implementations, when the second data packet carries the second control signaling, the second data packet further carries an identifier of the second security connection; or when the second data packet carries the second user plane data, the second data packet further carries an identifier of the first security connection.

Optionally, in some implementations, the processor 1001 of the security node network element is configured to: after the transceiver 1003 receives the first data packet, determine that the first data packet is transmitted via the second security connection or the first security connection.

Optionally, in some implementations, the first data packet further carries the identifier of the second security connection or the identifier of the first security connection, and the processor 1001 is specifically configured to: when the first data packet further carries the identifier of the second security connection, determine that the first data packet is transmitted via the second security connection; or when the first data packet further carries the identifier of the first security connection, determine that the first data packet is transmitted via the first security connection.

Optionally, in some implementations, the first security connection is a first IPsec tunnel, and the second security connection is a second IPsec tunnel.

Optionally, in some implementations, the identifier of the second security connection is a second SPI value, and the identifier of the first security connection is a first SPI value.

It should be understood that, the security node network element may be configured to perform procedures and/or steps corresponding to the security node network element in the foregoing method embodiments. To avoid repetition, details are not described herein again.

Figure 11:
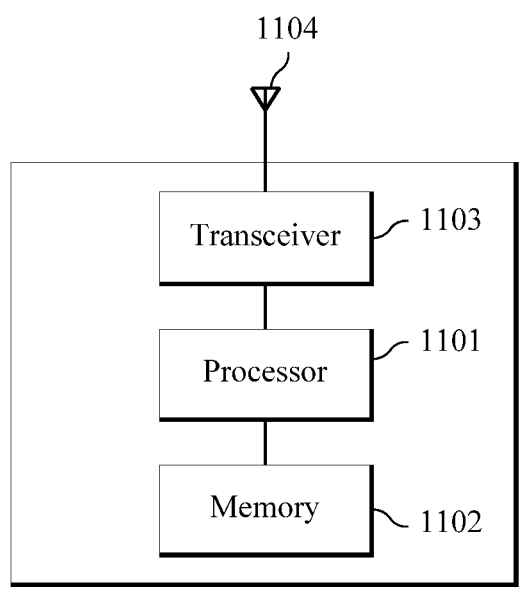
FIG. 11 is a schematic block diagram of another terminal according to an embodiment of the present disclosure.

FIG. 11 is a schematic block diagram of another terminal according to an embodiment of the present disclosure. Functional modules of the terminal may correspondingly perform steps and/or procedures performed by the terminal related to the methods shown in FIG. 3, FIG. 6, and FIG. 7. The terminal includes a processor 1101, a memory 1102, and a transceiver 1103. Components of the terminal are connected together in a coupling manner. The transceiver 1103 receives and sends data by using an antenna 1104.

The methods disclosed in the foregoing embodiments of the present disclosure may be applied to the processor 1101, or are implemented by the processor 1101. The processor 1101 may be an integrated circuit chip and has a signal processing capability. In an implementation process, the steps in the foregoing methods may be performed by using an integrated logic circuit of hardware in the processor 1101 or an instruction in a form of software. The processor 1101 may be a general purpose processor, a system-on-a-chip (SOC), a baseband processor, a digital signal processor (DSP), an application-specific integrated circuit (ASIC), a field programmable gate array (FPGA) or another programmable logic device, a discrete gate or transistor logic device, or a discrete hardware component. The processor may implement or perform methods, steps, and logical block diagrams disclosed in the embodiments of the present disclosure. The general purpose processor may be a microprocessor, or the processor may be any conventional processor or the like. Steps of the methods disclosed in the embodiments of the present disclosure may be directly performed and completed by a hardware decoding processor, or may be performed and completed by using a combination of hardware and software modules in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory 1102. The processor 1101 reads an instruction in the memory 1102, and performs the steps of the foregoing methods in combination with hardware of the processor.

The processor 1101 is configured to generate a first data packet, where the first data packet carries user plane data or control signaling; and the transceiver 1103 is configured to send the first data packet to the security node network element, where the first data packet is transmitted via a first security connection or a second security connection, the first security connection is used to transmit the first data packet carrying the first user plane data, and the second security connection is used to transmit the first data packet carrying the first control signaling.

A data packet carrying control signaling and a data packet carrying user plane data that are between the security node network element and the terminal are respectively transmitted via different security connections. In this way, the terminal identifies that the data packet carries the control signaling or the user plane data without a need of using an identifier that is added to the data packet and that a malicious application may modify, but identifies, by using a security connection identifier of a non-application layer, the data packets sent by the different security connections, so as to identify, based on the data packets sent by the different security connections, the data packet carrying the control signaling or the user plane data. Therefore, transmission security of the user plane data or the control signaling is improved.

Optionally, in some implementations, the transceiver 1103 of the terminal is further configured to receive a second data packet from the security node network element, where the second data packet carries second control signaling or second user plane data, and when the second data packet carries the second control signaling, the second data packet is transmitted via the second security connection, or when the second data packet carries the second user plane data, the second data packet is transmitted via the first security connection; and the processor 1101 is further configured to process the second control signaling by using a control plane protocol stack if the second data packet is transmitted via the second security connection; or configured to process the second user plane data by using a user plane protocol stack if the second data packet is transmitted via the first security connection.

Optionally, in some implementations, the processor 1101 is further configured to: after the transceiver receives the second data packet from the security node network element, determine that the second data packet is transmitted via the second security connection or the first security connection.

Optionally, in some implementations, the second data packet further carries an identifier of the second security connection or an identifier of the first security connection, and the processor 1101 is specifically configured to: when the second data packet further carries the identifier of the second security connection, determine that the second data packet is transmitted via the second security connection; or when the second data packet further carries the identifier of the first security connection, determine that the second data packet is transmitted via the first security connection.

Optionally, in some implementations, if the first data packet carries the first control signaling, the first data packet further carries the identifier of the second security connection; or if the first data packet carries the first user plane data, the first data packet further carries the identifier of the first security connection.

Optionally, in some implementations, the first security connection is a first IPsec tunnel, and the second security connection is a second IPsec tunnel.

Optionally, in some implementations, the identifier of the second security connection is a second SPI value, and the identifier of the first security connection is a first SPI value.

It should be understood that, the terminal may be configured to perform procedures and/or steps corresponding to the terminal in the foregoing method embodiments. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts shown as units may or may not be physical units, may be located in one position, or may be distributed on a plurality of network units. Some or all of the units may be selected depending on actual requirements to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure may be implemented in a form of a software product. The computer software product is stored in a storage medium and includes several instructions for instructing a computer device (which may be a personal computer, a server, a network device, or the like) or a processor to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method comprising:
receiving, by a security node network element, an uplink data packet from a terminal;
determining, by the security node network element, that the uplink data packet is received via a first security connection or a second security connection, wherein the first security connection is used to transmit a data packet carrying a user plane data, and wherein the second security connection is used to transmit a data packet carrying control signaling; and
sending, by the security node network element, an uplink user plane data carried in the uplink data packet to a user plane function entity when the uplink data packet is received via the first security connection; or
sending, by the security node network element, uplink control signaling carried in the uplink data packet to a control plane function entity when the uplink data packet is transmitted via the second security connection.

2. The method of claim 1, further comprising:
receiving, by the security node network element, downlink control signaling from the control plane function entity; and
sending, by the security node network element via the second security connection, the downlink control signaling to the terminal.

3. The method of claim 1, further comprising:
receiving, by the security node network element, downlink user plane data from the user plane function entity; and
sending, by the security node network element via the first security connection, the downlink user plane data to the terminal.

4. The method of claim 1, further comprising:
determining, by the security node network element, that the uplink data packet is received via the first security connection based on an identifier of the first security connection carried in the uplink data packet; and
determining, by the security node network element, that the uplink data packet is received via the second security connection based on an identifier of the second security connection carried in the uplink data packet.

5. The method of claim 1, wherein the first security connection is a first Internet Protocol Security (IPsec) tunnel, and wherein the second security connection is a second IPsec tunnel.

6. A communication method comprising:
generating an uplink data packet;
sending the uplink data packet to a security node network element via a first security connection when the uplink data packet carries an uplink user plane data;
sending the uplink data packet to the security node network element via a second security connection when the data packet carries uplink control signaling, wherein the first security connection is used to transmit a data packet carrying a user plane data, and wherein the second security connection is used to transmit a data packet carrying a control signaling;
receiving a downlink data packet from the security node network element;
determining whether the downlink data packet is transmitted via the first security connection or the second security connection; and
processing downlink control signaling carried in the downlink data packet by using a control plane protocol stack when the downlink data packet is transmitted via the second security connection; or
processing a downlink user plane data carried in the downlink data packet by using a user plane protocol stack when the downlink data packet is transmitted via the first security connection.

7. The method of claim 6, wherein the first security connection is a first Internet Protocol Security (IPsec) tunnel, and wherein the second security connection is a second IPsec tunnel.

8. The method of claim 6, wherein the downlink data packet further carries an identifier of a security connection which is used to transmit the downlink data packet, and wherein determining whether the downlink data packet is transmitted via the first security connection or the second security connection comprises:
  determining that the downlink data packet is transmitted via the second security connection in response to determining that the downlink data packet further carries the identifier of the second security connection; or
  determining that the downlink data packet is transmitted via the first security connection in response to determining that the downlink data packet further carries the identifier of the first security connection.

9. A security node network element comprising:
  a memory configured to store computer executable program code; and
  at least one processor coupled to the memory, wherein the program code comprises instructions that when executed by the at least one processor causes the security node network element to:
    receive an uplink data packet from a terminal;
    determine that the uplink data packet is received via a first security connection or a second security connection, wherein the first security connection is used to transmit a data packet carrying a user plane data, and the second security connection is used to transmit a data packet carrying control signaling; and
    send an uplink user plane data carried in the uplink data packet to a user plane function entity when the uplink data packet is received via the first security connection; or
    send uplink control signaling carried in the uplink data packet to a control plane function entity when the uplink data packet is transmitted via the second security connection.

10. The security node network element of claim 9, wherein the instructions further cause the security network element to:
  receive downlink control signaling from the control plane function entity; and
  send, via the second security connection, the downlink control signaling to the terminal.

11. The security node network element of claim 9, wherein the instructions further cause the security network element to:
  receive downlink user plane data from the user plane function entity; and
  send, via the first security connection, the downlink user plane data to the terminal.

12. The security node network element of claim 9, wherein the instructions further cause the security network element to:
  determine that the uplink data packet is received via the first security connection based on an identifier of the first security connection carried in the uplink data packet; and
  determine that the uplink data packet is received via the second security connection based on an identifier of the second security connection carried in the unlink data packet.

13. The security node network element of claim 9, wherein the first security connection is a first Internet Protocol Security (IPsec) tunnel, and wherein the second security connection is a second IPsec tunnel.

14. An apparatus comprising:
  a memory configured to store computer executable program code; and
  at least one processor coupled to the memory, wherein the program code comprises instructions that when executed by the at least one processor cause the apparatus to:
    generate an uplink data packet;
    send the unlink data packet to a security node network element via a first security connection when the uplink data packet carries an uplink user plane data; and
    send the uplink data packet to the security node network element via a second security connection when the uplink data packet carries uplink control signaling, wherein the first security connection is used to transmit a data packet carrying a user plane data, and wherein the second security connection is used to transmit a data packet carrying a control signaling;
    receive a downlink data packet from the security node network element;
    determine whether the downlink data packet is transmitted via the first security connection or the second security connection; and
    process downlink control signaling carried in the downlink data packet by using a control plane protocol stack when the downlink data packet is transmitted via the second security connection; or
    process a downlink user plane data carried in the downlink data packet by using a user plane protocol stack when the downlink data packet is transmitted via the first security connection.

15. The apparatus of claim 14, wherein the first security connection is a first Internet Protocol Security (IPsec) tunnel, and wherein the second security connection is a second IPsec tunnel.

16. The apparatus of claim 14, wherein the apparatus is a terminal or a chip in the terminal.

17. The apparatus of claim 14, wherein the downlink data packet further carries an identifier of a security connection which is used to transmit the downlink data packet, and wherein the instructions further cause the security network element to:
  determine that the downlink data packet is transmitted via the second security connection in response to determining that the downlink data packet further carries the identifier of the second security connection; or
  determine that the downlink data packet is transmitted via the first security connection in response to determining that the downlink data packet further carries the identifier of the first security connection.

18. The method of claim 1, further comprising receiving, by the user plane function entity, the uplink user plane data from the security node network element.

19. The method of claim 1, further comprising receiving, by the control plane function entity, the uplink control signaling from the security node network element.

20. A communication system comprising:
  a security node network element; and
  at least one of a user plane function entity or a control plane function entity, wherein the security node network element is configured to:
    receive an uplink data packet from a terminal;
    determine that the uplink data packet is received via a first security connection or a second security connection, wherein the first security connection is used to transmit a data packet carrying a user plane data, and wherein the second security connection is used to transmit a data packet carrying control signaling; and either send an uplink user plane data carried in the uplink data packet to the user plane function entity when the uplink data packet is received via the first security connection; or send uplink control signaling carried in the uplink data packet to the control plane function entity when the uplink data packet is transmitted via the second security connection;

wherein the user plane function entity is configured to receive the uplink user plane data from the security node network element, and wherein the control plane function entity is configured to receive the uplink control signaling from the security node network element.

* * * * *

UNITED STATES PATENT AND TRADEMARK OFFICE
CERTIFICATE OF CORRECTION

PATENT NO. : 10,812,980 B2
APPLICATION NO. : 16/380746
DATED : October 20, 2020
INVENTOR(S) : Hualin Zhu, Huan Li and Weisheng Jin It is certified that error appears in the above-identified patent and that said Letters Patent is hereby corrected as shown below:

In the Claims

Claim 12, Column 27, Line 62: "the unlink" should read "the uplink"

Claim 14, Column 28, Line 9: "the unlink" should read "the uplink"

Signed and Sealed this
Twenty-fourth Day of November, 2020

Andrei Iancu
*Director of the United States Patent and Trademark Office*